(12) United States Patent
Morishita

(10) Patent No.: US 10,974,308 B2
(45) Date of Patent: Apr. 13, 2021

(54) GUIDE APPARATUS FOR HAIRPIN-SHAPED HEAT EXCHANGER TUBES

(71) Applicant: HIDAKA SEIKI KABUSHIKI KAISHA, Tokyo (JP)

(72) Inventor: Keiichi Morishita, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 16/333,927

(22) PCT Filed: Nov. 22, 2016

(86) PCT No.: PCT/JP2016/084653
§ 371 (c)(1),
(2) Date: Mar. 15, 2019

(87) PCT Pub. No.: WO2018/096597
PCT Pub. Date: May 31, 2018

(65) Prior Publication Data
US 2019/0210090 A1     Jul. 11, 2019

(51) Int. Cl.
*B21D 53/08* (2006.01)
*B23P 19/12* (2006.01)
(Continued)

(52) U.S. Cl.
CPC ........... *B21D 53/08* (2013.01); *B21D 53/085* (2013.01); *B23P 19/12* (2013.01); *B23P 15/26* (2013.01);
(Continued)

(58) Field of Classification Search
CPC ....... B23P 15/26; B23P 19/12; F28F 2275/10; F28F 2280/06; F28F 2280/10; B21D 53/08; B21D 53/085
See application file for complete search history.

(56) References Cited

U.S. PATENT DOCUMENTS

| 5,426,847 A | 6/1995 | Honma et al. |
| 5,966,809 A | 10/1999 | Pierce |
| 2015/0367461 A1 | 12/2015 | Kondou et al. |

FOREIGN PATENT DOCUMENTS

| JP | 56-137921 | 10/1981 |
| JP | 61-216824 A | 9/1986 |

(Continued)

OTHER PUBLICATIONS

Korean Office Action for Korean Application No. 10-2019-7008950, dated May 11, 2020, with English translation.
(Continued)

*Primary Examiner* — Christopher J Besler
(74) *Attorney, Agent, or Firm* — Birch, Stewart, Kolasch & Birch, LLP

(57) ABSTRACT

Hairpin-shaped heat exchanger tubes are guided with respect to a fin stack in which through-holes are formed in three or more lines. A guide apparatus includes: a first guide portion provided with a plurality of first guide pins that extend in an inclined direction; a second guide portion provided with a plurality of second guide pins that extend in an inclined direction in an opposite direction; a first guide pin axial direction moving apparatus that moves the first guide portion along an axial direction; a second guide pin axial direction moving apparatus that moves the second guide portion along an axial direction; a first guide pin row direction moving apparatus that moves the first guide portion along the row direction; and a second guide pin row direction moving apparatus that moves the second guide portion along the row direction. The hairpin-shaped heat exchanger tubes are held in gaps between the first guide pins and the second guide pins.

3 Claims, 15 Drawing Sheets

(51) Int. Cl.
*B23P 15/26* (2006.01)
*F28D 1/047* (2006.01)
*F28F 1/32* (2006.01)

(52) U.S. Cl.
CPC .............. *F28D 1/0475* (2013.01); *F28F 1/32* (2013.01); *F28F 1/325* (2013.01); *F28F 2275/10* (2013.01); *F28F 2280/06* (2013.01)

(56) References Cited

FOREIGN PATENT DOCUMENTS

| JP | 6-15393 A | 1/1994 |
| JP | 11-505011 A | 5/1999 |
| JP | 3315151 B2 | 8/2002 |
| JP | 2006-110694 A | 4/2006 |
| JP | 2011-153783 A | 8/2011 |
| JP | 2014-166647 A | 9/2014 |

OTHER PUBLICATIONS

International Search Report, issued in PCT/JP2016/084653, dated Jan. 31, 2017.

GUIDE APPARATUS FOR HAIRPIN-SHAPED HEAT EXCHANGER TUBES

TECHNICAL FIELD

The present invention relates to a guide apparatus that holds hairpin-shaped heat exchanger tubes to be inserted into stacked fins.

BACKGROUND ART

As depicted in FIG. 13, a heat exchanger, such as an air conditioner, is constructed by inserting heat exchanger pipes, in which a heating medium flows, into through-holes 11 in a fin stack 10 that has been produced by stacking a plurality of fins 9 in which the through-holes 11 are formed. Hairpin-shaped heat exchanger tubes 20, which are formed by bending copper pipes into U shapes at a central part thereof, are used as the heat exchanger pipes.

Since the hairpin-shaped heat exchanger tubes 20 are formed by bending elongated soft members such as copper pipes, a force that acts so as to widen the legs will inevitably be produced, and the bent tubes are also susceptible to twisting.

For this reason, when inserting the hairpin-shaped heat exchanger tubes 20 into the fin stack 10, a guide apparatus that keeps the two ends of each hairpin-shaped heat exchanger tube 20 at a constant width and holds the hairpin-shaped heat exchanger tubes 20 so as to prevent twisting is required.

Examples of conventional guide apparatuses are depicted in FIGS. 14 and 15.

The guide apparatus depicted in FIG. 14 is similar to the device depicted in FIG. 17 of Patent Literature 1 and is equipped with a regulating plate 22, in which a plurality of V-shaped cutaway portions 23 are formed, and a moving plate 24, which moves with respect to the regulating plate 22 along the direction in which the plurality of cutaway portions 23 are formed. Hook portions 26 formed in U-shapes are formed in the moving plate 24.

The interval between the V-shaped apexes of adjacent cutaway portions 23 is set so as to be equal to the interval between the through-holes 11 in the fin stack 10. By disposing the respective legs of the hairpin-shaped heat exchanger tubes 20 in the cutaway portions 23, it is possible to set the widths of the legs of the respective hairpin-shaped heat exchanger tubes 20 at the widths of the through-holes 11. When the moving plate 24 is moved, the hook portions 26 of the moving plate 24 hold the upper surfaces of the legs housed in the cutaway portions 23.

The guide apparatus depicted in FIG. 15 is similar to the apparatus depicted in FIG. 14 of Patent Literature 1, includes a guide portion 29, in which an elongated hole 28 with the same width as the width to be maintained by the tubes is formed, and a center pin (not illustrated) which is inserted into the elongated hole 28 in a direction perpendicular to the direction in which a hairpin-shaped heat exchanger tube 20 is inserted into the guide portion 29. The entry side of the elongated hole 28 in the guide portion 29 is formed so that its diameter gradually increases toward the outside, which means that even a hairpin-shaped heat exchanger tube 20 that has widened can be reliably inserted into the elongated hole 28.

CITATION LIST

Patent Literature

Patent Literature 1: Japanese Patent No. 3,315,151

SUMMARY OF INVENTION

Technical Problem

With the conventional guide apparatuses described above, when the through-holes 11 formed in the fin stack 10 are in three or more lines, there is the problem that guiding cannot be performed with the described configurations. Note that with the configurations depicted in FIGS. 14 and 15, it is possible to handle up to two lines. With the configuration in FIG. 14, the positioning realized by the hook portions 26 is from one side, and with the configuration in FIG. 15, the positioning achieved by the center pin (not illustrated) is also from one side, which means that up to two lines can be handled in either configuration, but it is not possible to handle three or more lines.

As one example, when the through-holes of the fin stack 10 are formed in three or more lines so as to produce a zig-zag pattern, it has not been possible to perform guiding with the guide apparatuses depicted in either of FIGS. 14 and 15.

The present invention was conceived to solve the problem described above and has an object of providing a guide apparatus for hairpin-shaped heat exchanger tubes capable of guiding hairpin-shaped heat exchanger tubes into a fin stack that has through-holes formed in three or more lines.

Solution to Problem

A guide apparatus for hairpin-shaped heat exchanger tubes according to the present invention holds hairpin-shaped heat exchanger tubes and is to be used when inserting the hairpin-shaped heat exchanger tubes into through-holes of a fin stack of a heat exchanger, wherein the through-holes of the fin stack are formed in a plurality of lines, and the guide apparatus includes: a first guide portion provided with a plurality of first guide pins whose axial direction extends along an inclined direction toward a through-hole shifted by one row with respect to through-holes in different lines; a second guide portion provided with a plurality of second guide pins whose axial direction extends along an inclined direction toward a through-hole shifted by one row with respect to through-holes in different lines in a different direction to the inclined direction of the first guide pins; a first guide pin axial direction moving apparatus that moves the first guide portion along an axial direction of the first guide pins; a second guide pin axial direction moving apparatus that moves the second guide portion along an axial direction of the second guide pins; a first guide pin row direction moving apparatus that moves the first guide portion along a row direction of the through-holes; and a second guide pin row direction moving apparatus that moves the second guide portion along a row direction of the through-holes, wherein the hairpin-shaped heat exchanger tubes are held in gaps between the first guide pins and the second guide pins.

With the above configuration, it is possible to hold a plurality of hairpin-shaped heat exchanger tubes so as to be capable of being collectively inserted into a fin stack in which through-holes are formed across a plurality of lines, that is, three or more lines. Also, with this configuration, hairpin-shaped heat exchanger tubes are easily held on a plurality of lines for the through-holes on a plurality of lines. That is, after hairpin-shaped heat exchanger tubes have been inserted so as to be aligned in one line in gaps between the first guide pins and the second guide pins, by operating one of the first guide pin row direction moving apparatus and the second guide pin row direction moving apparatus before insertion of the hairpin-shaped heat exchanger tubes on the next line, it is possible to move the hairpin-shaped heat exchanger tubes that were held first in the column direction and the row direction. This means that by moving the first guide pins or the second guide pins in the row direction, the hairpin-shaped heat exchanger tubes that are being held are moved in an inclined direction (that is, in the column direction and the row direction) along the axial direction of the guide pins that do not move. By doing so, it is possible to insert the hairpin-shaped heat exchanger tubes to be held next at the positions where the previous hairpin-shaped heat exchanger tubes were initially held. As a result, in a case where hairpin-shaped heat exchanger tubes are to be held across a plurality of lines by the guide apparatus, it is not necessary to move insertion sides of the hairpin-shaped heat exchanger tubes relative to the guide apparatus to positions on a different line and then insert hairpin-shaped heat exchanger tubes into the guide apparatus or to fix the insertion sides of the hairpin-shaped heat exchanger tubes relative to the guide apparatus and move the entire guide apparatus to positions on a different line and insert the hairpin-shaped heat exchanger tubes.

A single cylinder apparatus, which includes a single rod, a first guide roller attached to one surface at an end of the rod, and a second guide roller attached to another surface at the end of the rod, may serve as the first guide pin axial direction moving apparatus and the second guide pin axial direction moving apparatus, the first guide portion may include a first guide plate to which the plurality of first guide pins are attached, a first guide channel may be formed in the first guide plate along a direction perpendicular to a direction in which the rod of the cylinder apparatus moves up and down, the first guide roller may be disposed inside the first guide channel, the second guide portion may include a second guide plate to which the plurality of second guide pins are attached, the second guide plate may be disposed at a position on an opposite side of the rod to the first guide plate, a second guide channel may be formed in the second guide plate along a direction perpendicular to the direction in which the rod of the cylinder apparatus moves up and down, and the second guide roller may be disposed inside the second guide channel.

With this configuration, it is possible to move the first guide pins and the second guide pins that move in different directions simultaneously using a single cylinder apparatus.

The guide apparatus may also include an entire guide moving apparatus that moves the guide apparatus along an axial direction of the hairpin-shaped heat exchanger tubes.

With this configuration, it is possible to move the guide apparatus in the direction of the fin stack in keeping with insertion of the hairpin-shaped heat exchanger tubes into the fin stack. This means that it is possible to always hold at positions that are appropriate for the hairpin-shaped heat exchanger tubes.

Advantageous Effects of Invention

With the guide apparatus for hairpin-shaped heat exchanger tubes according to the present invention, it is possible to guide hairpin-shaped heat exchanger tubes with respect to a fin stack with through-holes formed in three or more lines.

DESCRIPTION OF EMBODIMENTS

A guide apparatus for hairpin-shaped heat exchanger tubes (hereinafter referred to simply as a "guide apparatus") according to the present embodiment will now be described with reference to the drawings.

Figure 1:
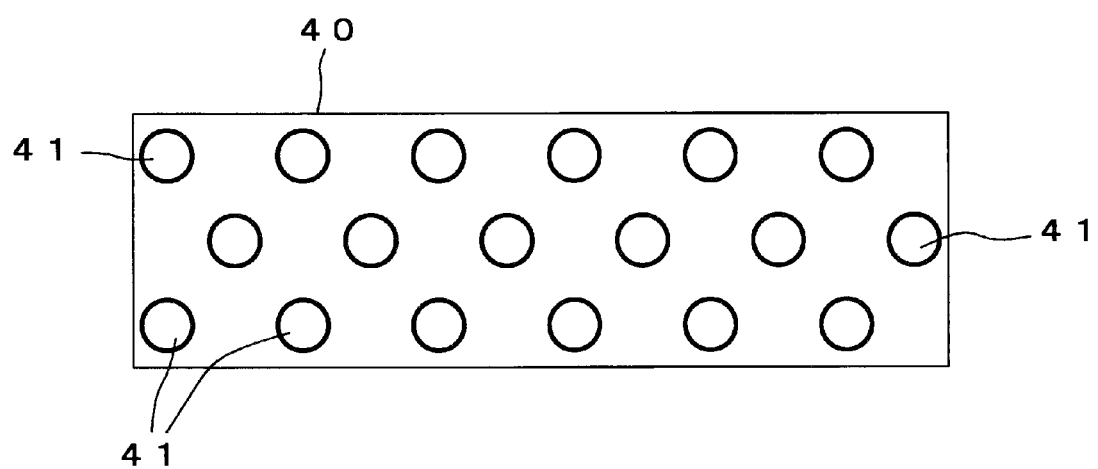
FIG. 1 is a front view of a fin stack in which three lines of through-holes are disposed in a zig-zag pattern.

First, FIG. 1 is a front view of a fin stack into which hairpin-shaped heat exchanger tubes 20 are to be inserted in the present embodiment. As depicted in FIG. 1, the fin stack 40 into which the hairpin-shaped heat exchanger tubes 20 are to be inserted in the present embodiment has a plurality of through-holes 41 disposed across several levels to produce a zig-zag pattern (that is, a state where the positions of the through-holes 41 alternate so as to be different in each row). In FIG. 1, the vertical direction corresponds to columns, the horizontal direction corresponds to rows, and two legs of one hairpin-shaped heat exchanger tube 20 are inserted into through-holes 41 that are aligned in the row direction.

Figure 2:
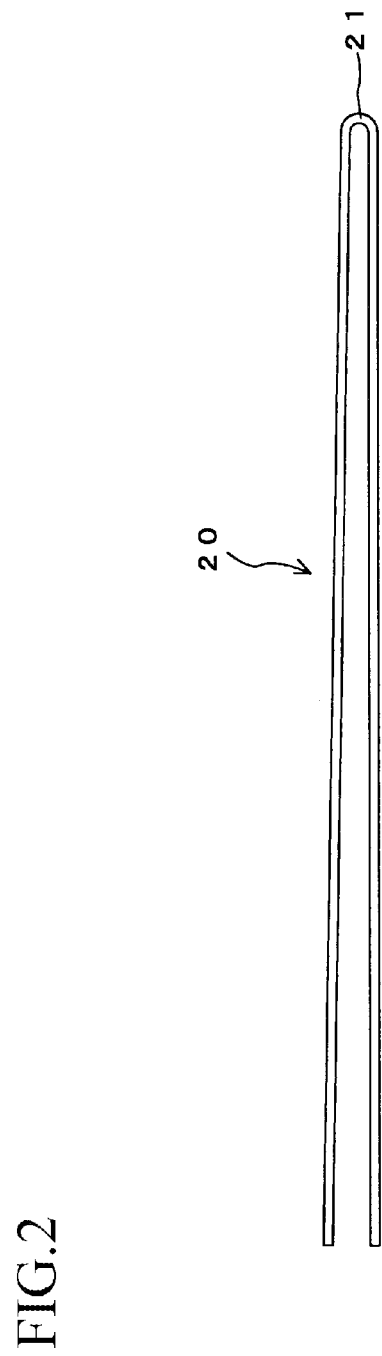
FIG. 2 is a plan view of a hairpin-shaped heat exchanger tube.

FIG. 2 is a plan view of a hairpin-shaped heat exchanger tube.

Each hairpin-shaped heat exchanger tube 20 is a metal tube made of a material with high thermal conductivity, such as a copper pipe, and is bent into a U shape at a bent portion 21 in the center.

Since the hairpin-shaped heat exchanger tubes 20 are bent into U shapes, it is common for the legs to widen due to elastic forces, and in some cases bending and twisting may also occur. This means that when inserting into the through-holes 41 of the fin stack 40, holding by a guide apparatus 50 like that in the present embodiment is necessary.

Figure 3:
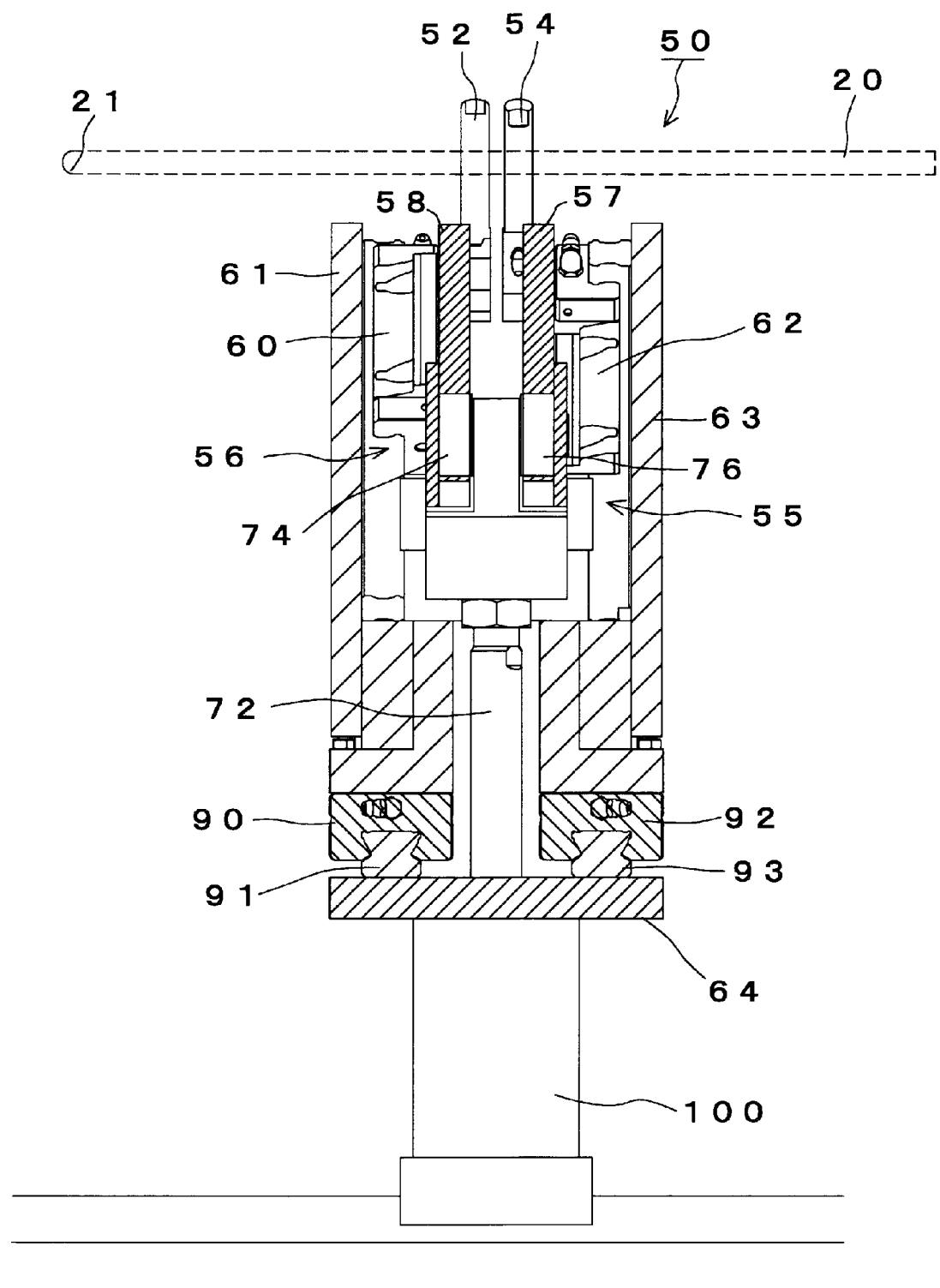
FIG. 3 is a side view of a guide apparatus for hairpin-shaped heat exchanger tubes according to the present embodiment.
Figure 4:
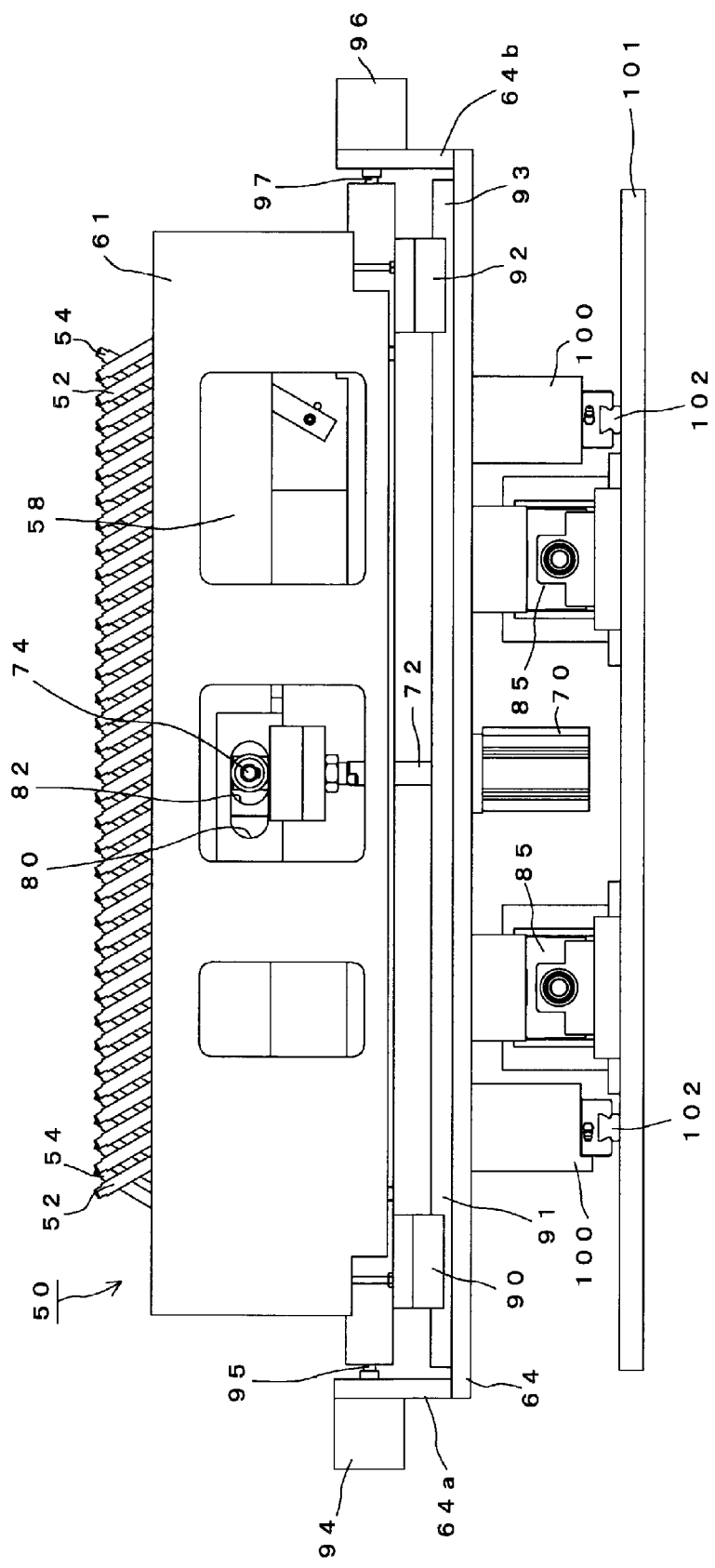
FIG. 4 is a front view of the guide apparatus for hairpin-shaped heat exchanger tubes depicted in FIG. 3.

FIG. 3 is a side view of a guide apparatus for hairpin-shaped heat exchanger tubes (hereinafter sometimes referred to simply as a "guide apparatus") according to the present embodiment and FIG. 4 is a front view of the guide apparatus.

Figure 5:
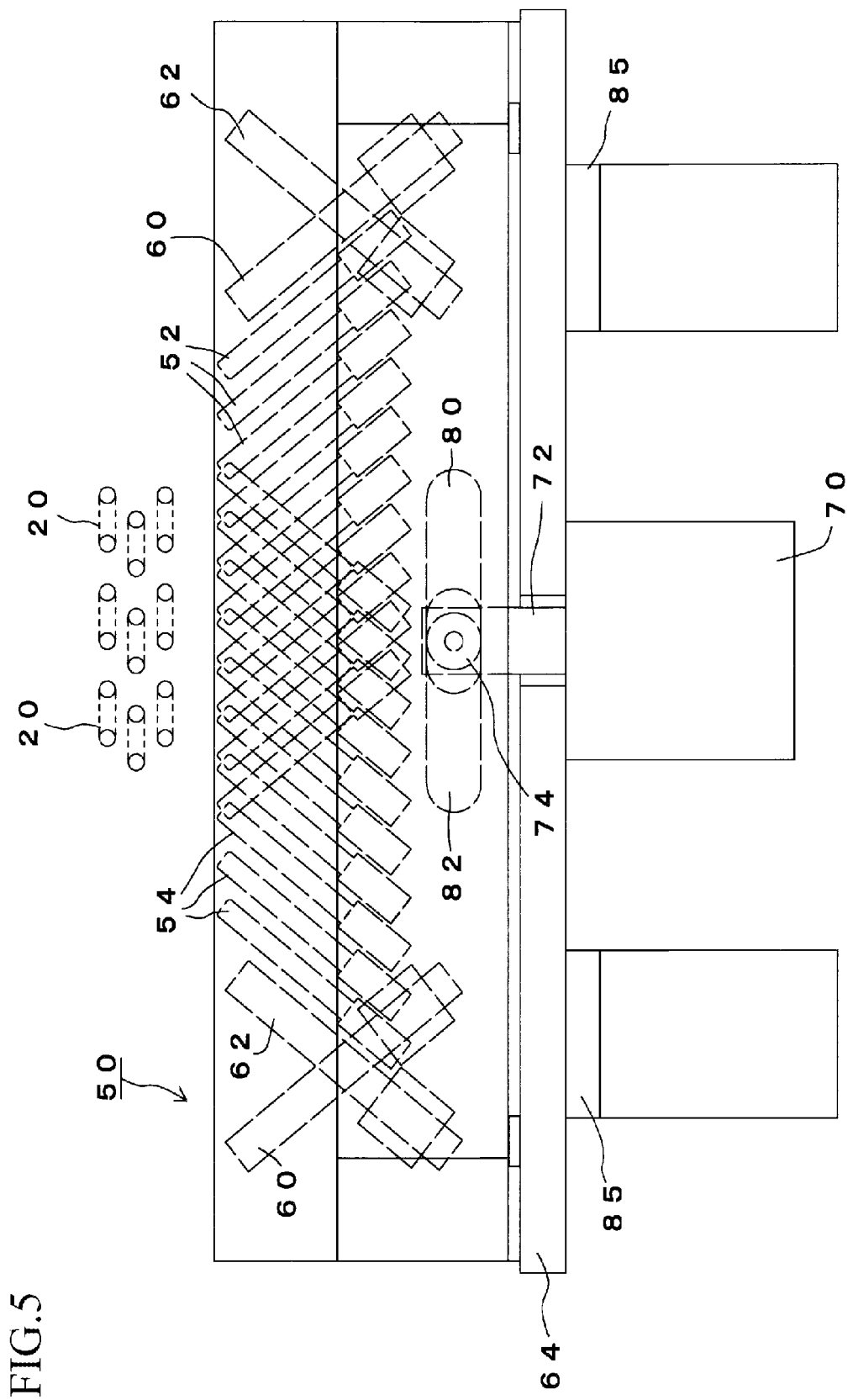
FIG. 5 is a front view of a guide apparatus in a state where the holding of hairpin-shaped heat exchanger tubes has been released.
Figure 6:
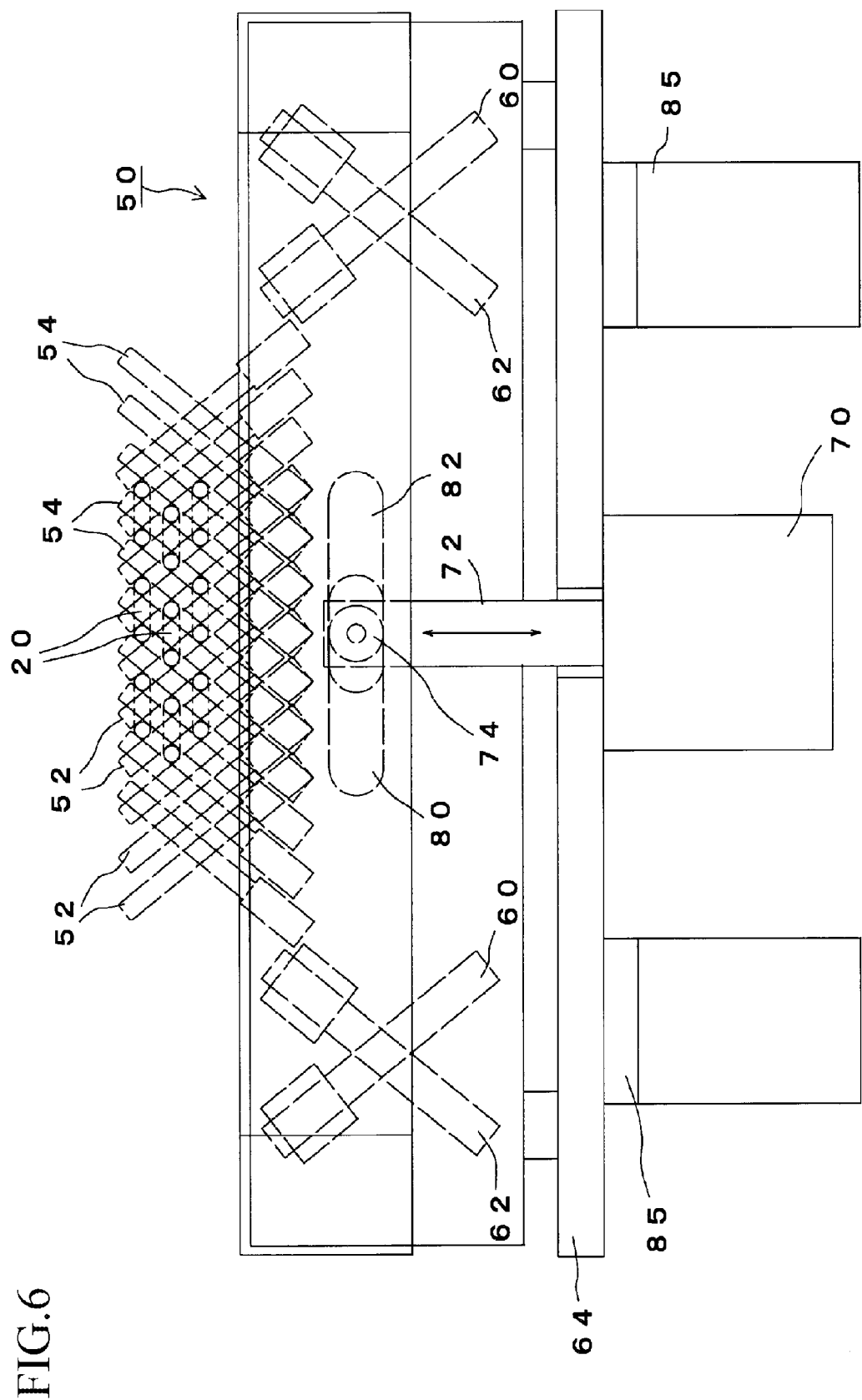
FIG. 6 is a front view of the guide apparatus for hairpin-shaped heat exchanger tubes in a state where hairpin-shaped heat exchanger tubes are being held.

FIG. 5 is a front view of the guide apparatus and depicts a state where the holding of hairpin-shaped heat exchanger tubes has been released. FIG. 6 is a front view of the guide apparatus and depicts a state where hairpin-shaped heat exchanger tubes are being held.

Here, it is assumed that the axial direction of a hairpin-shaped heat exchanger tube 20 extends from the front toward the rear, the bent portion 21 of each hairpin-shaped heat exchanger tube 20 is disposed at the front side, and a fin stack is disposed at the rear side.

The present embodiment is configured with the through-holes 41 of the fin stack 40 oriented in the horizontal direction and the hairpin-shaped heat exchanger tubes 20 are moved and inserted in the horizontal direction.

Note that insertion of the hairpin-shaped heat exchanger tubes 20 into the through-holes 41 may involve pressing the hairpin-shaped heat exchanger tubes 20 toward the fin stack 40 or may involve pressing the fin stack 40 toward the hairpin-shaped heat exchanger tubes 20. A configuration for pressing the hairpin-shaped heat exchanger tubes 20 or a configuration for pressing the fin stack is omitted here.

The guide apparatus 50 is configured so that a plurality of first guide pins 52 and a plurality of second guide pins 54 are disposed in inclined directions at positions that are a predetermined distance apart along the axial direction of the hairpin-shaped heat exchanger tubes 20 to be guided and appear to intersect one another when looking from the front.

The hairpin-shaped heat exchanger tubes 20 are held by being clamped in gaps 59 formed by the plurality of second guide pins 54 intersecting the plurality of first guide pins 52 when looking from the front, at a position that is a predetermined distance from the plurality of first guide pins 52 along the axial direction of the hairpin-shaped heat exchanger tubes 20.

The plurality of first guide pins 52 are provided on a first guide portion 56. The first guide portion 56 includes a first guide plate 58 to which the plurality of first guide pins 52 are attached, first linear movement guides 60 that guide movement of the first guide plate 58, and a first linear movement guide attachment plate 61 to which the first linear movement guides 60 are attached.

The first linear movement guides 60 extend in a direction that matches the axial direction of the first guide pins 52 and are capable of guiding movement of the first guide plate 58 along the axial direction of the first guide pins 52.

The first guide pins 52 are attached to the first guide plate 58 so that their axial direction extends along a direction that is inclined toward through-holes 41 that are shifted by one row relative to the through-holes 41 in a different line. That is, the axial directions of the first guide pins 52 are disposed so as to extend along a tangential direction that joins the surfaces of the tubes of hairpin-shaped heat exchanger tubes 20 disposed at different positions in the column direction (that is, the up-down direction).

A lower end portion of the first linear movement guide attachment plate 61 is attached to a first guide portion 90 that is movable along the row direction. The first guide portion 90 is configured to be movable on a rail 91 along the row direction in which the first guide pins 52 are arranged. The rail 91 is provided on a base 64.

The plurality of second guide pins 54 are attached to a second guide portion 55. The second guide portion 55 includes a second guide plate 57 to which the plurality of second guide pins 54 are attached, second linear movement guides 62 that guide movement of the second guide plate 57, and a second linear movement guide attachment plate 63 to which the second linear movement guides 62 are attached.

The second linear movement guides 62 extend in a direction that matches the axial direction of the second guide pins 54 and are capable of guiding movement of the second guide plate 57 along the axial direction of the second guide pins 54.

The second guide pins 54 are attached to the second guide plate 57 so that their axial direction extends along a direction that differs to the first guide pins 52 and is inclined toward through-holes 41 that are shifted by one row relative to the through-holes 41 in a different line. That is, the axial directions of the second guide pins 54 are disposed so as to extend along a tangential direction (a tangential direction in a different direction that differs to the axial direction of the first guide pins 52) that joins the surfaces of the tubes of hairpin-shaped heat exchanger tubes 20 disposed at different positions in the column direction (that is, the up-down direction).

A lower end portion of the second linear movement guide attachment plate 63 is attached to a second guide portion 92 that is movable along the row direction. The second guide portion 92 is configured to be movable on a rail 93 along the row direction in which the second guide pins 54 are arranged. The rail 93 is provided on the base 64.

A cylinder apparatus 70 for moving the plurality of first guide pins 52 and the plurality of second guide pins 54 at the same time is provided in the center of the base 64 when looking from the front and from the side.

The cylinder apparatus 70 realizes a first guide pin axial direction moving apparatus that moves the first guide pins and a second guide pin axial direction moving apparatus that moves the second guide pins as a single device.

A rod 72 of the cylinder apparatus 70 extends upward, a first guide roller 74 is attached to a front side of the end portion of the rod 72, and a second guide roller 76 is attached to a rear side of the end portion of the rod 72.

As the cylinder apparatus 70, it is possible to use an electric actuator, an air cylinder, a hydraulic cylinder, or the like.

An elongated hole 80 that extends along the row direction (that is, the left-right direction) is formed in the first guide plate 58. the first guide roller 74 is disposed inside the elongated hole 80 so as to be capable of rolling.

The elongated hole 80 formed in the first guide plate 58 is formed so that in a state like FIG. 5 where the first guide pins 52 have been lowered and the hairpin shaped heat exchanger tubes 20 are not supported, the elongated hole 80 extends from the position where the first guide roller 74 is disposed toward the right when looking from the front.

An elongated hole 82 that extends along the row direction (that is, the left-right direction) is also formed in the second guide plate 57. The second guide roller 76 is disposed inside the elongated hole 82 so as to be capable of rolling.

The elongated hole 82 formed in the second guide plate 57 is formed so that in a state like FIG. 5 where the second guide pins 54 have been lowered and the hairpin-shaped heat exchanger tubes 20 are not supported, the elongated hole 82 extends from the position where the second guide roller 76 is disposed toward the left when looking from the front.

As depicted in FIG. 6, when the cylinder apparatus 70 operates so as to extend the rod 72, the first guide roller 74 attached to the end of the rod 72 rolls inside the elongated hole 80 and the elongated hole 80 moves toward the left when looking from the front. That is, the first guide plate 58 moves diagonally toward the upper left when looking from the front. Due to the first guide plate 58 moving diagonally toward the upper left when looking from the front (that is, in the guiding direction of the first linear movement guides 60), the first guide pins 52 move diagonally toward the upper left when looking from the front along the guiding direction of the first linear movement guides 60.

Also, as depicted in FIG. 6, when the cylinder apparatus 70 operates so as to extend the rod 72, the second guide roller 76 attached to the end of the rod 72 rolls inside the elongated hole 82 and the elongated hole 82 moves toward the right when looking from the front, which is to say, the second guide plate 57 moves diagonally toward the upper right when looking from the front. Due to the second guide plate 57 moving diagonally toward the upper right when looking from the front (that is, in the guiding direction of the second linear movement guides 62), the second guide pins 54 move diagonally toward the upper right when looking from the front along the guiding direction of the second linear movement guides 62.

Figure 7:
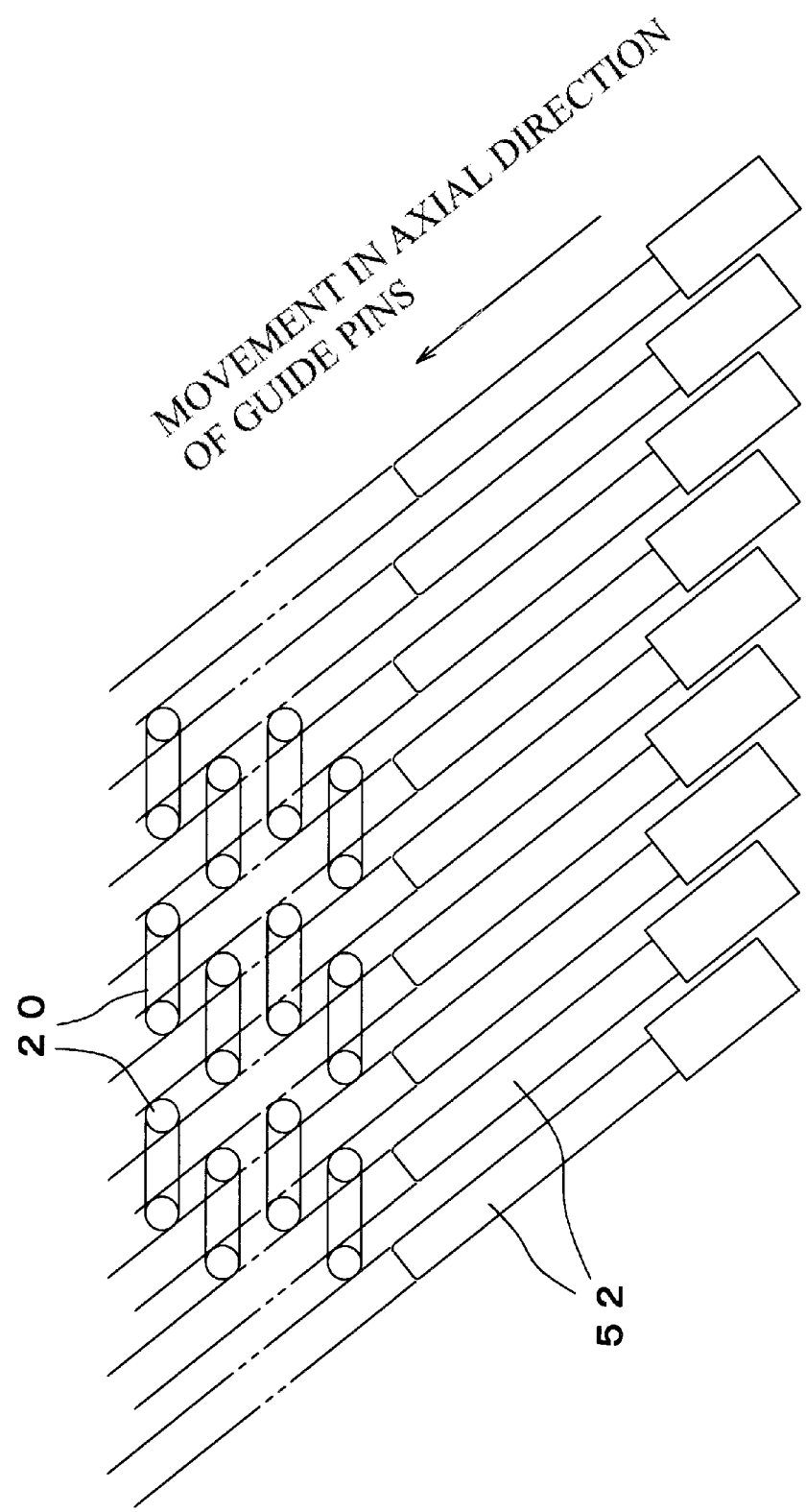
FIG. 7 is a diagram useful in explaining first guide pins.
Figure 8:
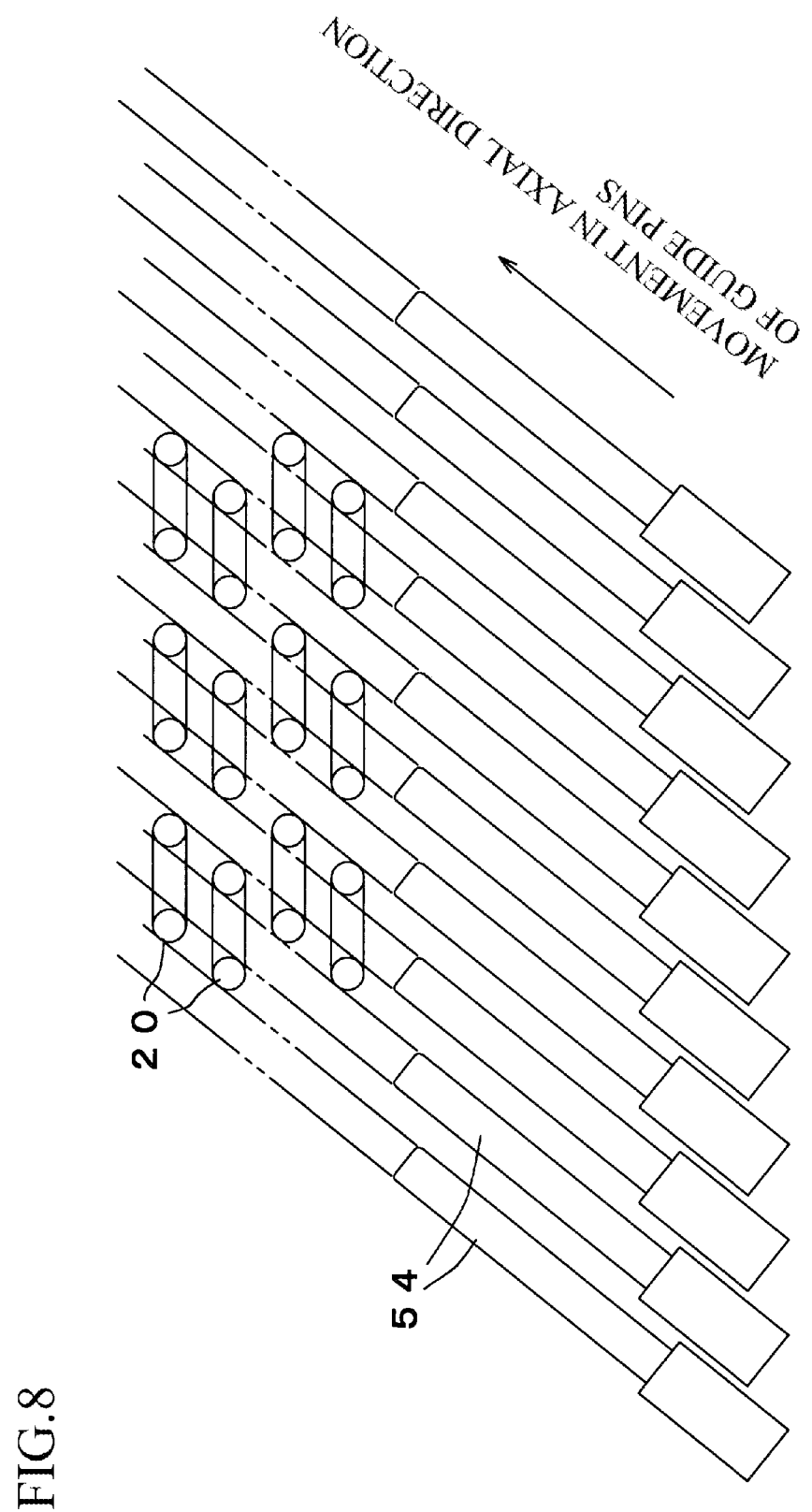
FIG. 8 is a diagram useful in explaining second guide pins.
Figure 9:
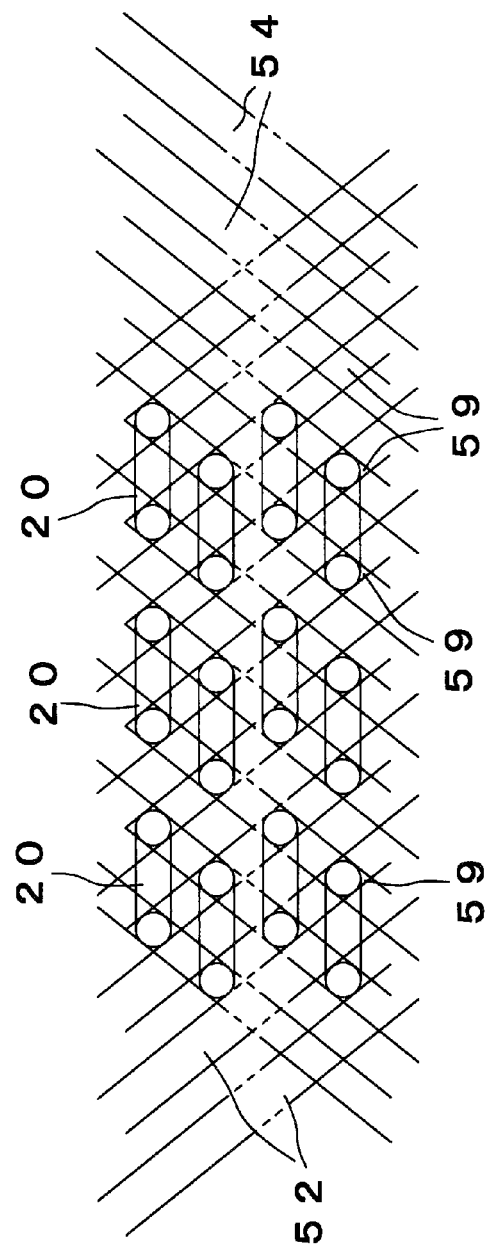
FIG. 9 is a diagram useful in explaining a state where hairpin-shaped heat exchanger tubes are held by the first guide pins and the second guide pins.

FIG. 7 depicts an operation that moves the plurality of first guide pins 52 relative to the hairpin-shaped heat exchanger tubes 20 and FIG. 8 depicts an operation that moves the plurality of second guide pins 54 relative to the hairpin-shaped heat exchanger tubes 20. FIG. 9 depicts a state where the hairpin-shaped heat exchanger tubes 20 that have been disposed in a zig-zag pattern in four lines are held by the guide apparatus.

As depicted in FIG. 7, the first guide pins 52 have a diameter that passes inside at least two hairpin-shaped heat exchanger tubes 20 disposed at different positions in the up-down direction. The axial direction of the first guide pins 52 extends in a direction that is inclined toward a through-hole 41 which is shifted by one row relative to the through-holes 41 in a different line. That is, the axial direction of the first guide pins 52 is disposed so as to extend along a tangential direction that joins the surfaces of the tubes of hairpin-shaped heat exchanger tubes 20 disposed at different positions in the column direction (that is, the up-down direction).

As depicted in FIG. 8, the second guide pins 54 have a diameter that passes inside at least two hairpin-shaped heat exchanger tubes 20 disposed at different positions in the up-down direction, these two hairpin-shaped heat exchanger tubes 20 being located in a different direction to the first guide pins 52. The axial direction of the second guide pins 54 extends in a direction that is inclined toward a through-hole 41 which is shifted by one row relative to the through-holes 41 in a different line and that is a different direction to the first guide pins 52. That is, the axial direction of the second guide pins 54 is disposed so as to extend along a tangential direction (a tangential direction in a different direction to the axial direction of the first guide pins 52) that joins the surfaces of the tubes of hairpin-shaped heat exchanger tubes 20 disposed at different positions in the column direction (that is, the up-down direction).

As depicted in FIG. 9, due to the plurality of first guide pins 52 and the plurality of second guide pins 54 being disposed so as to intersect when viewed from the front, the gaps 59 are produced in a lattice. The hairpin-shaped heat exchanger tubes 20 are disposed in these gaps 59, resulting in the hairpin-shaped heat exchanger tubes 20 being held.

Note that the gaps 59 are set with a size that makes it possible for the hairpin-shaped heat exchanger tubes 20 to freely move along their axial direction.

Next, the configuration of a first guide pin row direction moving apparatus that moves the first guide pins in the row direction and a second guide pin row direction moving apparatus that moves the second guide pins in the row direction will be described.

The first guide portion 90 is provided with a first guide pin row direction moving apparatus for moving the first guide portion 90 in the row direction. In the present embodiment, a cylinder apparatus 94 is used as the first guide pin row direction moving apparatus. The cylinder apparatus 94 is attached to a side plate 64a that is upwardly erected from one of the left and right ends of the base 64 when looking from the front. A rod 95 of the cylinder apparatus 94 is connected to the first guide portion 90.

When the cylinder apparatus 94 operates, the first guide portion 90 moves along the rail 91. Together with this, the first linear movement guide attachment plate 61 moves along the rail 91. In turn with this, it is possible to move the first linear movement guides 60, the first guide plate 58, and the first guide pins 52 in the row direction along the rail 91.

The second guide portion 92 is provided with a second guide pin row direction moving apparatus for moving the second guide portion 92 in the row direction. In the present embodiment, a cylinder apparatus 96 is used as the second guide pin row direction moving apparatus. The cylinder apparatus 96 is attached to a side plate 64b that is upwardly erected from the other out of the left and right ends of the base 64 when looking from the front. A rod 97 of the cylinder apparatus 96 is connected to the second guide portion 92.

When the cylinder apparatus 96 operates, the second guide portion 92 moves along the rail 93. Together with this, the second linear movement guide attachment plate 63 moves along the rail 93. In turn with this, it is possible to move the second linear movement guides 62, the second guide plate 57, and the second guide pins 54 in the row direction along the rail 93.

Note that the first guide pin row direction moving apparatus and the second guide pin row direction moving apparatus are not limited to cylinder apparatuses and it is also possible to use ball screws, linear actuators, or the like.

Note that the guide apparatus 50 is provided so as to be capable of moving along the axial direction of the hairpin-shaped heat exchanger tubes 20.

An installation base 101 is disposed below the base 64 of the guide apparatus 50. Between the base 64 and the installation base 101, an entire guide moving apparatus 85, which moves the entire guide apparatus 50 along the axial direction of the hairpin-shaped heat exchanger tubes 20, is provided.

Rails 102 that extend along the axial direction of the hairpin-shaped heat exchanger tubes 20 are provided on the left and right sides of the upper surface of the installation base 101 when looking from the front. Guide portions 100, which are attached to the lower surface of the base 64, are mounted on the rails 102. By mounting the guide portions 100 on the rail 102, movement of the guide apparatus 50 by the entire guide moving apparatus 85 is performed smoothly.

By providing the entire guide moving apparatus 85 as described above, it is possible to move the guide apparatus 50 in the direction of the fin stack 40 or in the opposite direction to the fin stack 40 during insertion of the hairpin-shaped heat exchanger tubes 20 into the fin stack 40. This means that it is possible to always perform holding at a position that is appropriate for the hairpin-shaped heat exchanger tubes 20.

Note that as the entire guide moving apparatus 85, it is possible to use a ball screw, a linear actuator, or the like.

Two guide apparatuses 50 may be disposed along the axial direction of the hairpin-shaped heat exchanger tubes 20. A configuration where the two guide apparatuses 50 are capable of being independently moved along the axial direction of the hairpin-shaped heat exchanger tubes 20 by the guide entire movement device 85 may be used.

By providing two guide devices 50 in this way, it is possible to perform holding at positions that are appropriate for elongated hairpin-shaped heat exchanger tubes 20, which makes it possible to reliably suppress widening and twisting of the hairpin-shaped heat exchanger tubes 20. By using a configuration where it is possible to move the two guide apparatuses 50 independently in the axial direction of the hairpin-shaped heat exchanger tubes 20 with the entire guide moving apparatus 85, it is possible for each of the two guide devices 50 to perform holding at an appropriate position in keeping with the insertion state of the hairpin-shaped heat exchanger tubes 20.

Next, the operation and effect of the first guide pin row direction moving apparatus and the second guide pin row direction moving apparatus will be described.

Figure 10:
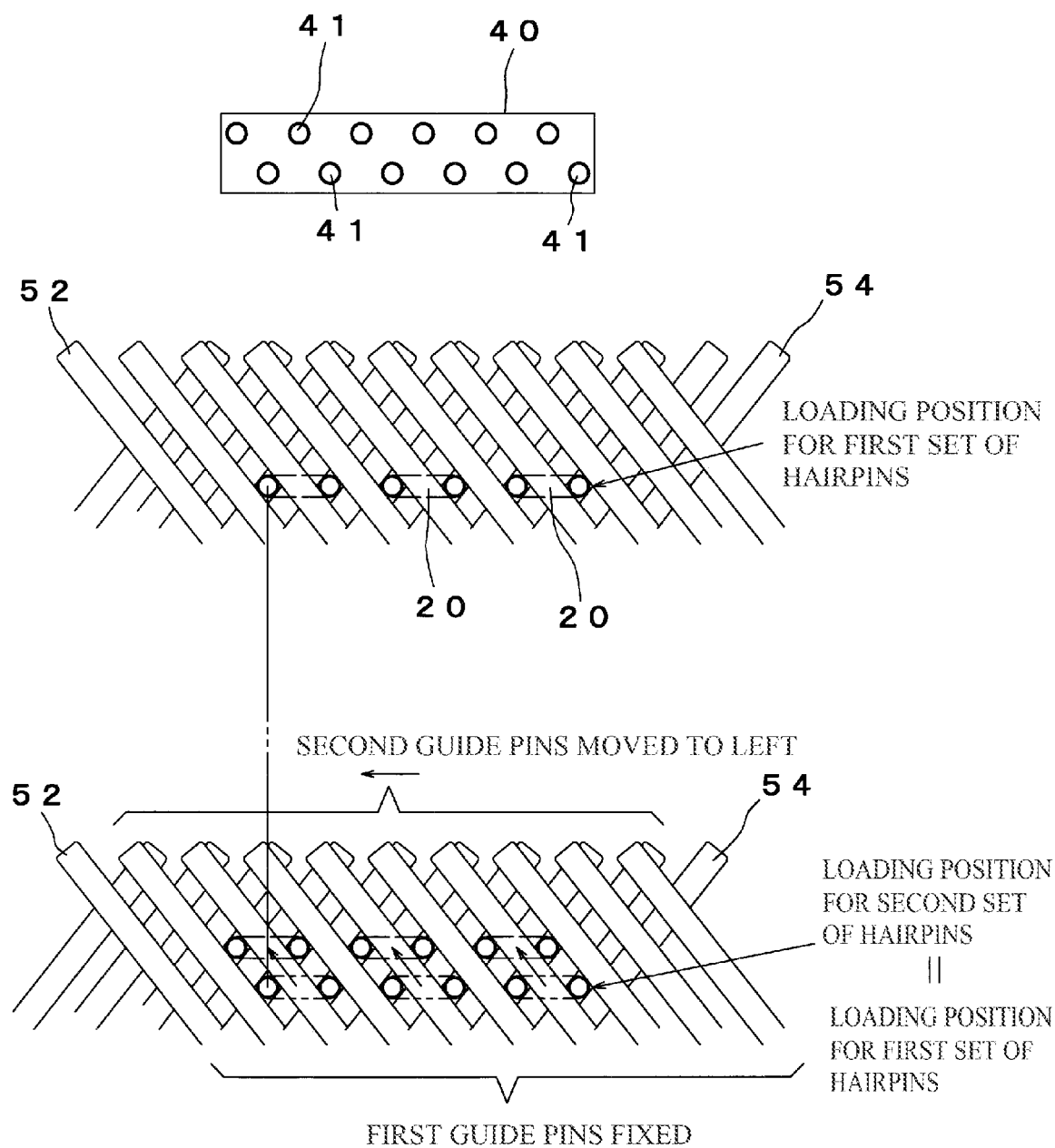
FIG. 10 is a diagram useful in explaining operations of a first guide pin row direction moving apparatus and a second guide pin row direction moving apparatus in a case where two lines of hairpin-shaped heat exchanger tubes are inserted into a fin stack.

First, FIG. 10 depicts a case where the fin stack 40 has the through-holes 41 arranged in two lines in the up-down direction in a zig-zag pattern.

Firstly, a first set of hairpin-shaped heat exchanger tubes 20 are inserted into gaps between the first guide pins 52 and the second guide pins 54 of the guide apparatus 50. At this time, the insertion positions into the guide apparatus 50 of the first set of hairpin-shaped heat exchanger tubes 20 are set at the same height position as the lower line out of the two lines of through-holes 41 in the fin stack 40 and so that the positions in the row direction of the hairpin-shaped heat exchanger tubes 20 are the same positions as the positions of the through-holes 41.

The upper line out of the two lines of through-holes 41 in the fin stack 40 in FIG. 10 are shifted to the left by half of one pitch when looking from the front compared to the lower line (for a case where the interval between the through-holes in the row direction is set as "one pitch").

For this reason, by operating the second guide pin row direction moving apparatus, all of the plurality of second guide pins 54 are moved horizontally to the left when looking from the front. The movement distance is one pitch, which is the interval between the through-holes.

At this time, the first guide pin row direction moving apparatus does not operate and the first guide pins 52 are fixed at the same positions.

Figure 11:
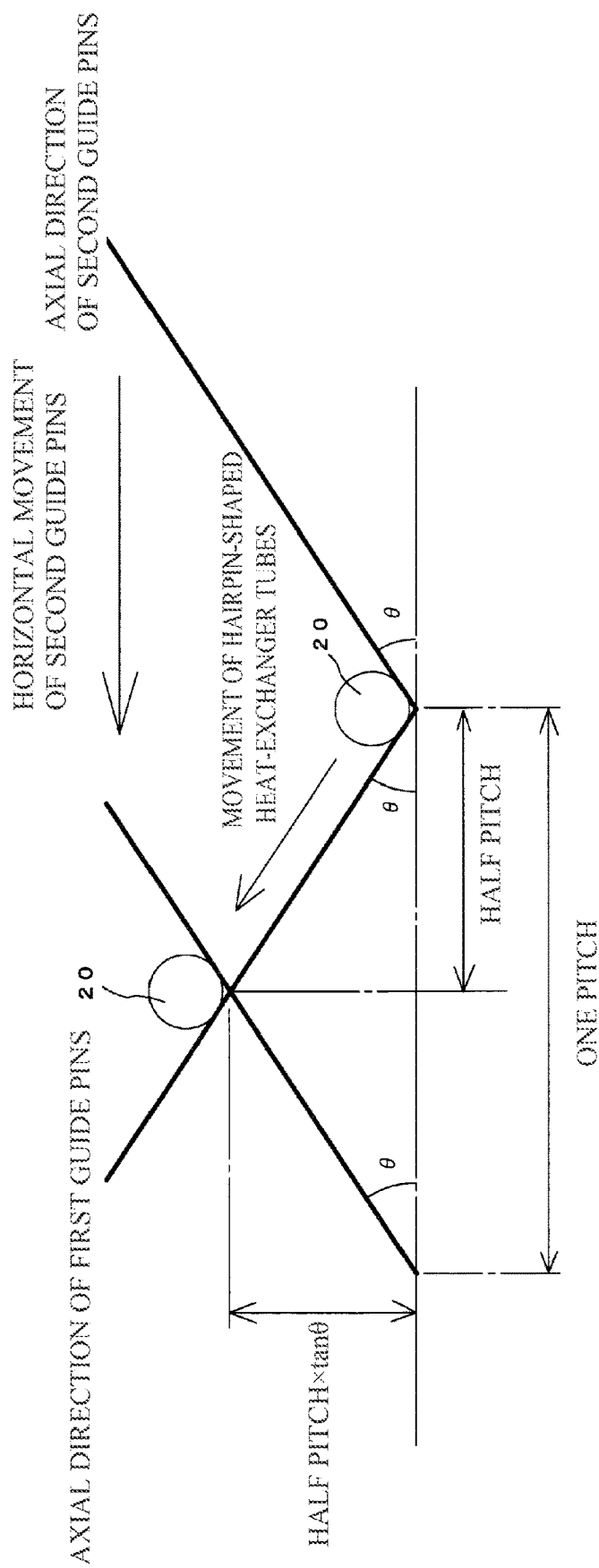
FIG. 11 is a diagram useful in explaining movement of the hairpin-shaped heat exchanger tubes that accompanies movement of the second guide pins in the row direction.

As depicted in FIG. 11, due to the plurality of second guide pins 54 moving horizontally to the left when looking from the front, the first set of hairpin-shaped heat exchanger tubes 20 move diagonally upward to the left along the axial direction of the first guide pins 52. More specifically, since the second guide pins 54 move by one pitch, the first set of hairpin-shaped heat exchanger tubes 20 move by a half pitch to the left. The angle of inclination of the first guide pins 52 with respect to a horizontal plane and the angle of inclination of the second guide pins 54 with respect to a horizontal plane are the same angle, and when this angle of inclination is expressed as "$\theta$", the distance moved upward by the first set of hairpin-shaped heat exchanger tubes 20 is given as a half pitch$\times \tan \theta$. In the present embodiment, the angle of inclination $\theta$ with respect to the horizontal plane of the first guide pins 52 and the second guide pins 54 is set so that the first set of hairpin-shaped heat exchanger tubes 20 move to positions that match the height positions of the through-holes 41 in the second line due to the second guide pins 54 moving by one pitch in the row direction.

After the second guide pins 54 have moved horizontally by one pitch to the left, the operation of the second guide pin row direction moving apparatus stops.

At this time, the first set of hairpin-shaped heat exchanger tubes 20 become disposed at positions that match the upper line out of the two lines of through-holes 41 of the fin stack 40.

As a result, the positions where the first set of hairpin-shaped heat exchanger tubes 20 were held become unoccupied, and a second set of hairpin-shaped heat exchanger tubes 20 are inserted here. These positions match the height position and row direction positions of the through-holes 41 in the lower line on the fin stack 40.

In this way, even when the fin stack 40 has two lines of through-holes 41, it is still possible to insert the hairpin-shaped heat exchanger tubes 20 into the guide apparatus 50 with the insertion positions always kept at the same positions.

Figure 12:
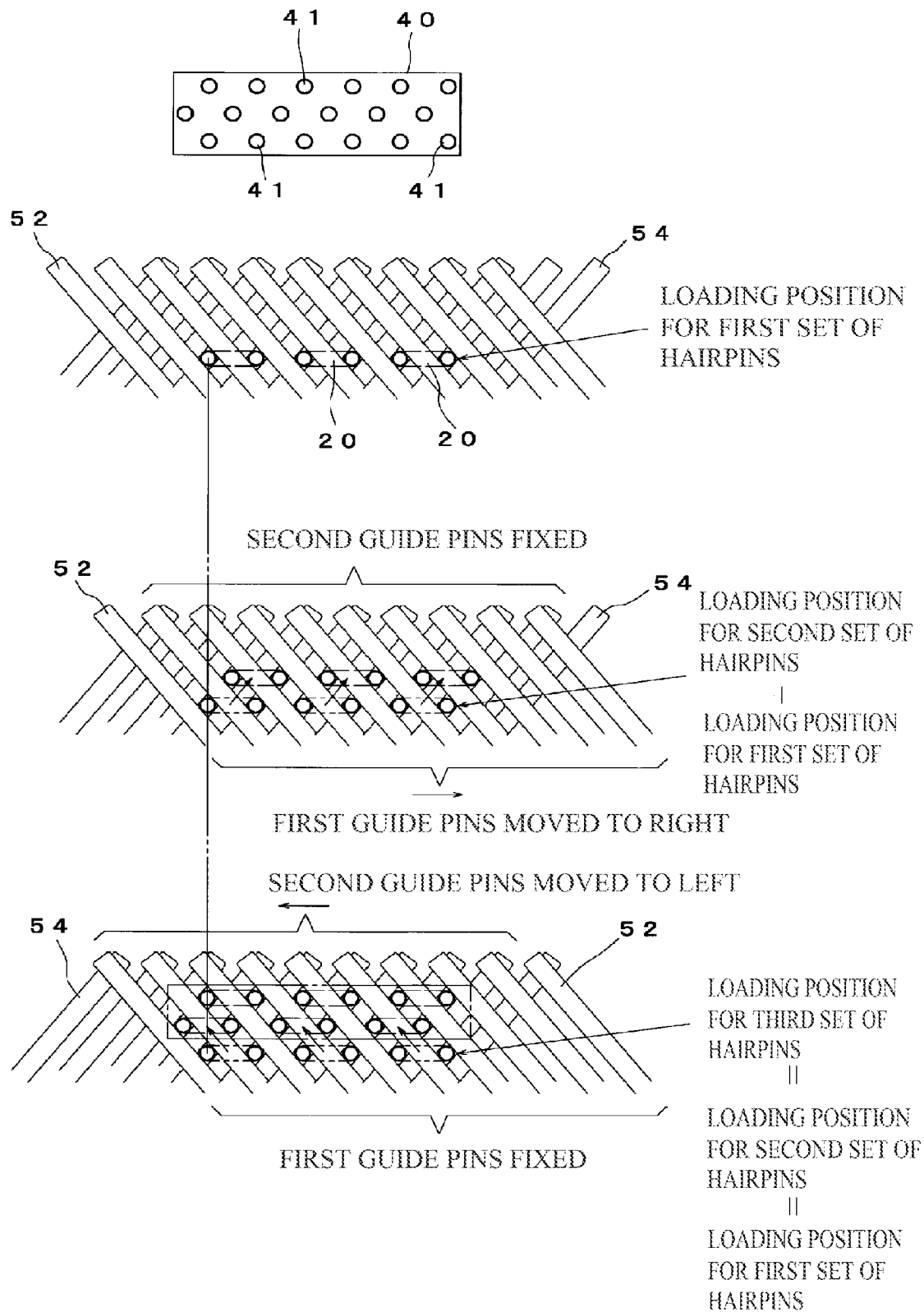
FIG. 12 is a diagram useful in explaining operations of the first guide pin row direction moving apparatus and the second guide pin row direction moving apparatus in a case where three lines of hairpin-shaped heat exchanger tubes are inserted into a fin stack.
Figure 13:
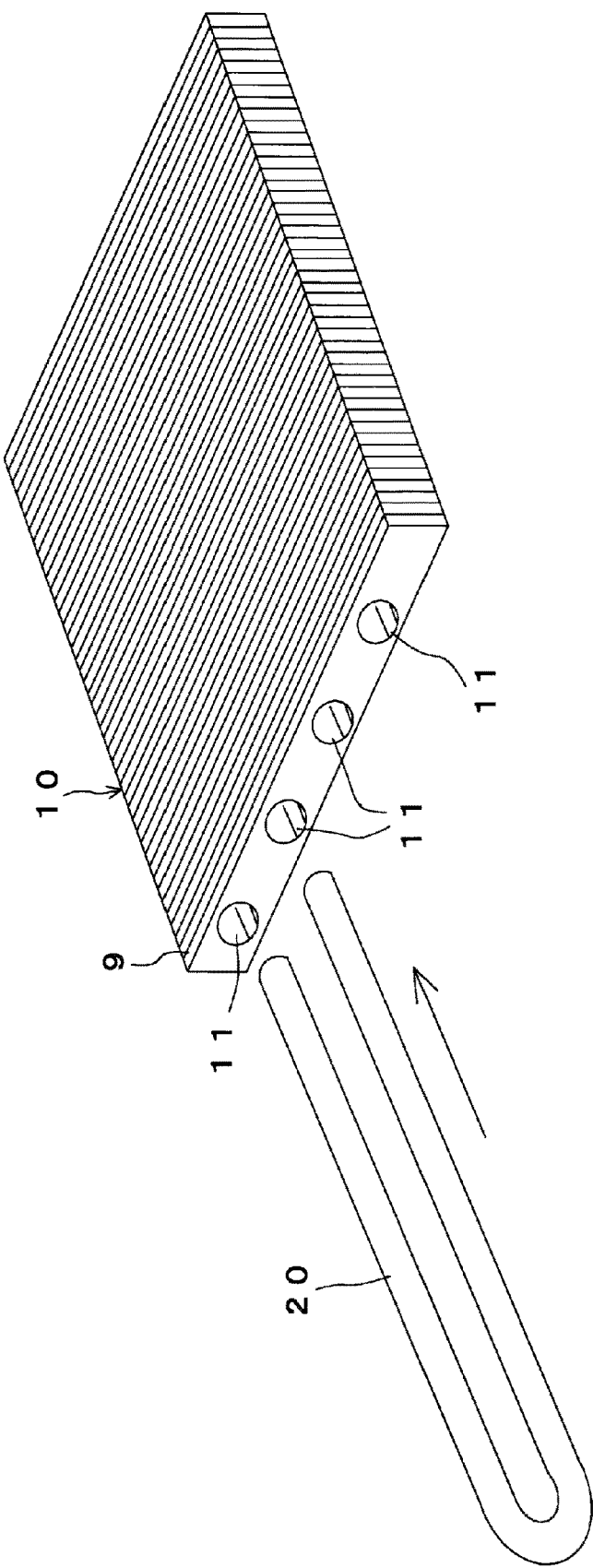
FIG. 13 is a diagram useful in explaining insertion into a fin stack of a hairpin-shaped heat exchanger tube.
Figure 14:
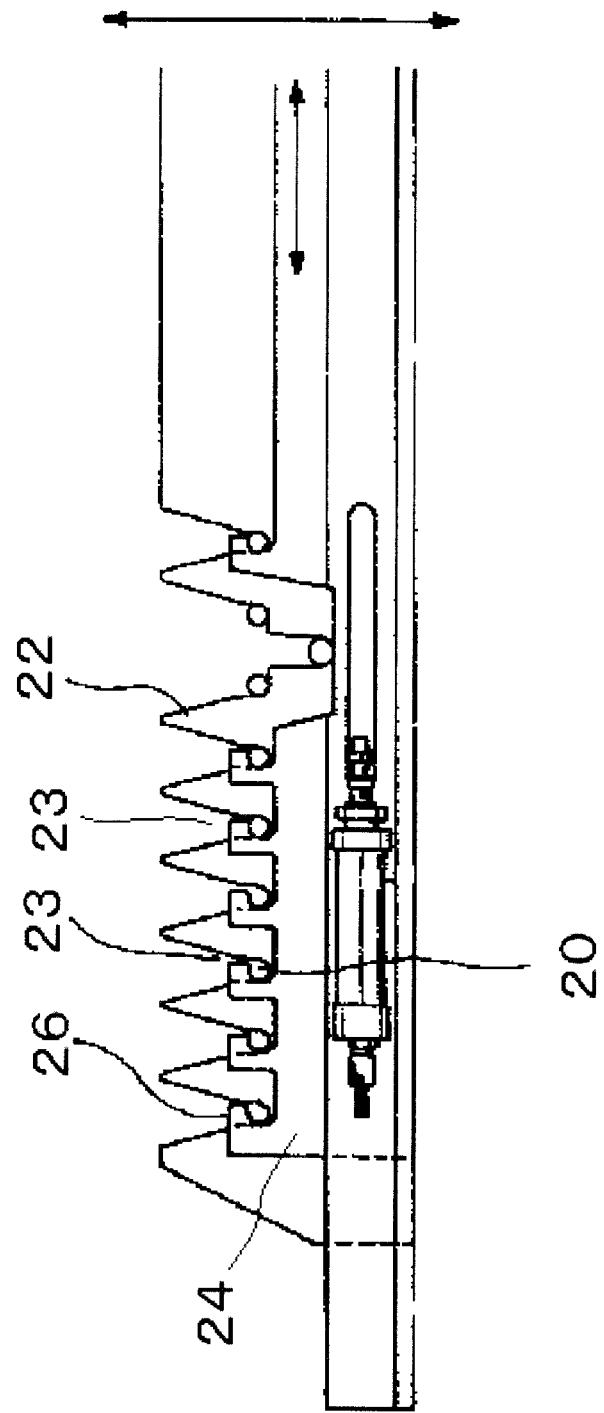
FIG. 14 is a diagram useful in explaining a conventional guide apparatus for hairpin-shaped heat exchanger tubes.
Figure 15:
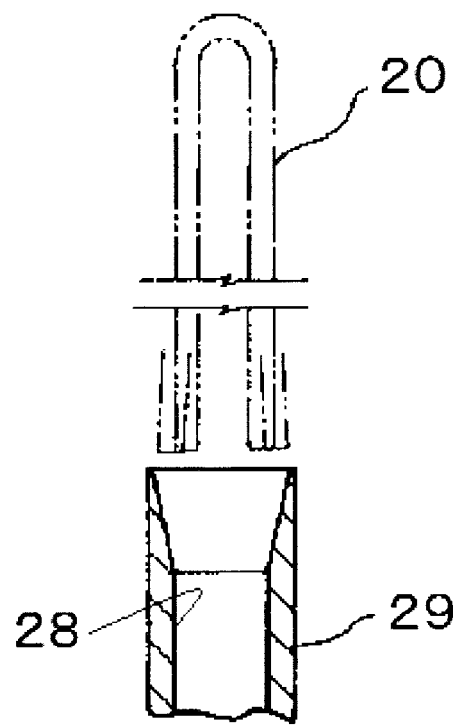
FIG. 15 is a diagram useful in explaining another configuration of a conventional guide apparatus for hairpin-shaped heat exchanger tubes.

Next, FIG. 12 depicts a case where the fin stack 40 has the through-holes 41 arranged in three lines in the up-down direction in a zig-zag pattern.

Firstly, a first set of hairpin-shaped heat exchanger tubes 20 are inserted into gaps between the first guide pins 52 and the second guide pins 54 of the guide apparatus 50. At this time, the insertion positions into the guide apparatus 50 of the first set of hairpin-shaped heat exchanger tubes 20 are set at the same height position as the lower line out of the two lines of through-holes 41 in the fin stack 40 and so that the positions in the row direction of the hairpin-shaped heat exchanger tubes 20 are the same positions as the positions of the through-holes 41.

Next, by operating the first guide pin row direction moving apparatus, the plurality of first guide pins 52 are moved horizontally to the right when looking from the front. The movement distance is one pitch, which is the interval between the through-holes.

At this time, the second guide pin row direction moving apparatus does not operate and the second guide pins 54 are fixed at the same positions.

Due to the plurality of first guide pins 52 moving horizontally to the right when looking from the front, the first set of hairpin-shaped heat exchanger tubes 20 move diagonally upward to the right along the axial direction of the second guide pins 54. More specifically, since the first guide pins 52 move by one pitch, the first set of hairpin-shaped heat exchanger tubes 20 move by a half pitch to the right. The angle of inclination of the first guide pins 52 with respect to the horizontal plane and the angle of inclination of the second guide pins 54 with respect to the horizontal plane are the same angle, and when this angle of inclination is expressed as "$\theta$", the distance moved upward by the first set of hairpin-shaped heat exchanger tubes 20 is given as a half pitch$\times \tan \theta$. In the present embodiment, the angle of inclination $\theta$ with respect to the horizontal plane of the first guide pins 52 and the second guide pins 54 is set so that the first set of hairpin-shaped heat exchanger tubes 20 move to positions that match the height positions of the through-holes 41 in the center due to the second guide pins 54 moving by one pitch in the row direction.

After the first guide pins 52 have moved horizontally by one pitch to the right, the operation of the first guide pin row direction moving apparatus stops.

At this time, the first set of hairpin-shaped heat exchanger tubes 20 become disposed at positions that match the center line out of the three lines of through-holes 41 of the fin stack 40 (at this time, the positions in the row direction do not match).

As a result, the positions where the first set of hairpin-shaped heat exchanger tubes 20 were held become unoccupied, and a second set of hairpin-shaped heat exchanger tubes 20 are inserted here. These positions match the height position and row direction positions of the through-holes 41 in the lower line on the fin stack 40.

Next, by operating the second guide pin row direction moving apparatus, the plurality of second guide pins 54 are moved horizontally to the left when looking from the front. The movement distance is one pitch, which is the interval between the through-holes.

At this time, the first guide pin row direction moving apparatus does not operate and the first guide pins 52 are fixed at the same positions.

Due to the plurality of second guide pins 54 moving horizontally to the left when looking from the front, the first set of hairpin-shaped heat exchanger tubes 20 move diagonally upward to the left along the axial direction of the first guide pins 52. Since the first guide pins 52 move by one pitch, the first set of hairpin-shaped heat exchanger tubes 20 move by a half pitch to the left.

At the same time, the second set of hairpin-shaped heat exchanger tubes 20 also move diagonally upward to the left along the axial direction of the first guide pins 52. Since the second guide pins 52 move by one pitch, the second set of hairpin-shaped heat exchanger tubes 20 move by a half pitch to the left.

After the second guide pins 54 have moved horizontally by one pitch to the left, the operation of the second guide pin row direction moving apparatus stops.

At this time, the first set of hairpin-shaped heat exchanger tubes 20 become disposed at positions that match the upper line out of the three lines of through-holes 41 of the fin stack 40 and the second set of hairpin-shaped heat exchanger tubes 20 become disposed at positions that match the center line out of the three lines of through-holes 41 of the fin stack 40.

As a result, the positions where the first set of hairpin-shaped heat exchanger tubes 20 were first held become unoccupied, and a third set of hairpin-shaped heat exchanger tubes 20 are inserted here. These positions match the height position and row direction positions of the through-holes 41 in the lower line on the fin stack 40.

In this way, even when the fin stack 40 has three lines of through-holes 41, it is still possible to insert the hairpin-shaped heat exchanger tubes 20 into the guide apparatus 50 with the insertion position always kept at the same position.

Even when the fin stack 40 has four or more lines of through-holes 41, in the same way as the operation described above, by causing the first guide pin row direction moving apparatus and the second guide pin row direction moving apparatus to operate alternately, it is possible to move hairpin-shaped heat exchanger tubes 20 that were previously held by the guide apparatus 50 to height positions corresponding to successively higher lines, and possible to always insert the hairpin-shaped heat exchanger tubes 20 at the same position on the guide apparatus 50. Note that when the fin stack 40 has three or more lines of through-holes 42, when the hairpin-shaped heat exchanger tubes 20 that were previously held by the guide apparatus 50 are moved to successively higher lines, although the height position of the upper lines will match, the row positions will not match. However, it is sufficient to control the order of movement of the first guide pins 52 and the second guide pins 54 so that after hairpin-shaped heat exchanger tubes 20 have finally been held the same number of times as the number of lines of through-holes in the fin stack 40, the height positions and row direction positions of the respective hairpin-shaped heat exchanger tubes 20 match the through-holes 41 of the fin stack 40.

Although various preferred embodiments of the present invention have been described above, it should be obvious that the present invention is not limited to such embodiments and can be subjected to a variety of modifications within a range that does not depart from the spirit of the invention.

What is claimed is:

1. A guide apparatus that is adapted to hold hairpin-shaped heat exchanger tubes and is to be used when inserting hairpin-shaped heat exchanger tubes into through-holes of a fin stack of a heat exchanger,
   wherein the through-holes of the fin stack are formed in a plurality of lines, and
   the guide apparatus comprises:
   a first guide portion provided with a plurality of first guide pins, the plurality of first guide pins extending along a first inclined direction from one of the through-holes of the fin stack to an adjacent first through-hole in a first line of the plurality of the lines, the first line being adjacent to the one of the through-holes;
   a second guide portion provided with a plurality of second guide pins, the plurality of second guide pins extending along a second inclined direction from the one of the through-holes of the fin stack to an adjacent second through-hole in the first line adjacent to the one of the through-holes, the second inclined direction being different from the first inclined direction of the first guide pins;
   a first and second guide pin axial direction moving apparatus that moves the first guide portion along an axial direction of the first guide pins and moves the second guide portion along an axial direction of the second guide pins;
   a first guide pin row direction moving apparatus that moves the first guide portion along a row direction of the through-holes; and
   a second guide pin row direction moving apparatus that moves the second guide portion along a row direction of the through-holes,
   wherein hairpin-shaped heat exchanger tubes are adapted to be held in gaps between the first guide pins and the second guide pins.

2. The guide apparatus adapted to hold hairpin-shaped heat exchanger tubes according to claim 1,
   wherein a single cylinder apparatus, which includes a single rod, a first guide roller attached to one surface at an end of the rod, and a second guide roller attached to another surface at the end of the rod, serves as the first and second guide pin axial direction moving apparatus,
   the first guide portion includes a first guide plate to which the plurality of first guide pins are attached, a first guide channel is formed in the first guide plate along a direction perpendicular to a direction in which the rod of the cylinder apparatus moves up and down, and the first guide roller is disposed inside the first guide channel, the second guide portion includes a second guide plate to which the plurality of second guide pins are attached, the second guide plate is disposed at a position on an opposite side of the rod to the first guide plate, a second guide channel is formed in the second guide plate along a direction perpendicular to the direction in which the rod of the cylinder apparatus moves up and down, and the second guide roller is disposed inside the second guide channel.

3. The guide apparatus adapted to hold hairpin-shaped heat exchanger tubes according to claim 1, further comprising an entire guide moving apparatus that moves the guide apparatus along an axial direction of hairpin-shaped heat exchanger tubes.

* * * * *